United States Patent [19]

Wood et al.

[11] Patent Number: 4,848,213
[45] Date of Patent: Jul. 18, 1989

[54] RECIPROCATING PISTON COMPRESSOR WITH OFFSET CYLINDER

[75] Inventors: Mark W. Wood, Erie, Mich.; Mark E. Charpie; Ralph A. Wisniewski, both of Toledo, Ohio

[73] Assignee: The DeVilbiss Company, Toledo, Ohio

[21] Appl. No.: 142,097

[22] Filed: Jan. 11, 1988

[51] Int. Cl.$^4$ ............................................. F16J 1/00
[52] U.S. Cl. ..................................... 92/172; 92/261; 417/489; 74/49
[58] Field of Search ............... 92/261, 240, 242, 172, 92/182, 243, 244; 417/559, 569, 571, 489; 74/49; 123/193 P, 193 CP, 197 AC

[56] References Cited

U.S. PATENT DOCUMENTS

| | | | |
|---|---|---|---|
| 1,736,974 | 11/1929 | King | 74/49 |
| 3,774,461 | 11/1973 | Smith | 74/49 |
| 3,985,475 | 10/1976 | Gatecliff | 417/539 |
| 4,517,931 | 5/1985 | Nelson | 123/197 AC |
| 4,540,352 | 9/1985 | Becker | 92/240 |

FOREIGN PATENT DOCUMENTS

| | | | |
|---|---|---|---|
| 3444233 | 6/1986 | Fed. Rep. of Germany | 123/197 AC |
| 0027360 | 2/1986 | Japan | 74/49 |
| 0717377 | 2/1980 | U.S.S.R. | 92/261 |
| 0815366 | 3/1981 | U.S.S.R. | 74/49 |

OTHER PUBLICATIONS

*Black and Decker* Inflator/Compressor Instruction Manual Model No. 9527, 5/87.

*Primary Examiner*—Robert E. Garrett
*Assistant Examiner*—Thomas Denion
*Attorney, Agent, or Firm*—MacMillan, Sobanski & Todd

[57] ABSTRACT

A reciprocating piston compressor of the type having the piston fixed to the connecting rod. The centerline of the cylinder is offset from the centerline of the crankshaft in a direction which reduces the maximum angle between the piston and the cylinder axis during the compression stroke. The offset reduces the maximum side loading on the piston to in turn reduce piston seal wear.

1 Claim, 2 Drawing Sheets

RECIPROCATING PISTON COMPRESSOR WITH OFFSET CYLINDER

TECHNICAL FIELD

The invention relates to reciprocating piston compressors and more particularly to an improved reciprocating piston compressor of the type having the piston formed integral with a connecting rod such that the piston rocks relative to the cylinder axis as it is reciprocated.

BACKGROUND ART

In one type of reciprocating piston compressor, the piston is connected through a wrist pin to a connecting rod. The piston is restrained to strictly linear movement as it reciprocates in a cylinder. In this type of compressor, adequate oil lubrication is critical to the life of the compressor.

In a second type of reciprocating piston compressor, the piston is formed integral with the connecting rod. As the lower end of the connecting rod is rotated by an eccentric on a crank shaft, the piston reciprocates and also rocks relative to the cylinder axis. Sufficient clearance must be provided between the cylinder wall and the piston to permit the required rocking motion. A resilient piston ring or seal is used to maintain a sliding seal between the piston and the cylinder walls as the piston reciprocates and rocks. The seal does not require oil lubrication and, consequently, this type of compressor is sometimes referred to as an oilless compressor. Normally, the maintenance free operating life of an oilless compressor is determined by the life of the piston seal. In many prior art oilless compressors, the piston seal requires replacement after only a few hundred hours of operation, and sometimes after as few as 50 hours of operation.

In a conventional oilless compressor, the axis of the cylinder intersects the axis of the crank shaft. As a consequence, the piston will be perpendicular to the cylinder axis at both top dead center and bottom dead center. At 90 degrees of crank shaft rotation after top dead center and at 90 degrees of crank shaft rotation after bottom dead center, the piston will have equal and maximum angles of tilt relative to the cylinder axis. Accordingly, the piston will rock through the same angle during the compression stroke when it is under load as during the intake stroke when load is at a minimum.

DISCLOSURE OF INVENTION

According to the present invention, an improvement is made in the construction of an oilless reciprocating piston compressor to reduce piston seal wear. Piston seal wear appears to be a function of many factors including seal material, the finish on the cylinder wall, and the operating temperature of the seal. It has been found that as the angle between the piston and the cylinder axis increases while the piston is under load, the increased side loading on the seal increases seal wear. By decreasing the piston angle relative to the cylinder axis during the compression stroke, seal wear is decreased and the useful maintenance free operating life of the compressor is increased. This is accomplished by offsetting the cylinder axis relative to the crank shaft axis in a direction which provides a decreased maximum angle between the piston and the cylinder axis during the compression stroke and an increased maximum angle between the piston and the cylinder axis during the intake stroke when loads are at a minimum.

Accordingly, it is an object of the invention to provide an improved reciprocating piston compressor of the type having an integral piston and connecting rod.

Another object of the invention is to increase the operating life of a piston seal in a reciprocating piston compressor of the type having an integral piston and connecting rod.

Other objects and advantages of the invention will be apparent from the following detailed description and the accompanying drawings.

BEST MODE FOR CARRYING OUT THE INVENTION

Figure 1:
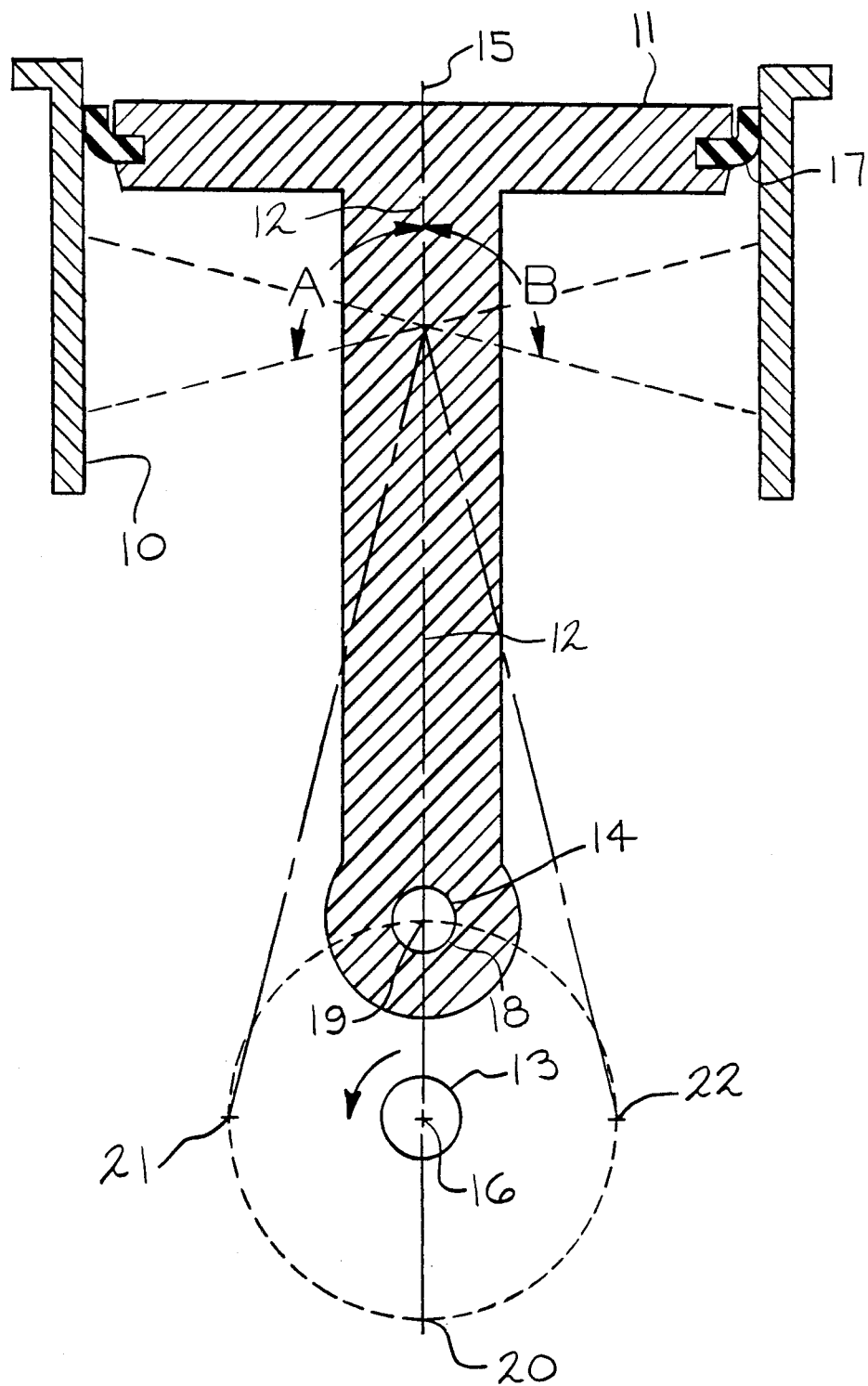
FIG. 1 is a fragmentary cross sectional view of a portion of a prior art reciprocating piston oilless compressor illustrating a piston at different positions relative to a cylinder.

Turning to FIG. 1 of the drawings, a fragmentary cross sectional view is shown of portions of a prior art reciprocating piston oilless compressor having a cylinder 10, a piston 11 with an integral connecting rod 12, and a crank shaft 13 having an eccentric 14. The compressor is constructed such that an axis 15 of the cylinder 10 passes through an axis 16 of the crank shaft 13. The piston 11 and the connecting rod 12 are integrally formed such that the connecting rod 12 always extends at an angle of 90 degrees from the plane of the piston 11. A cup shaped seal 17 is attached to the piston 11 to form a sliding seal between the piston 11 and the interior walls of the cylinder 10. The connecting rod 12 has a lower end 18 which is attached to and is rotated by the crank shaft eccentric 14.

As the crank shaft 13 is rotated in a counter clockwise direction by a suitable motor, not shown, the piston 11 is reciprocated between an uppermost position at top dead center when the eccentric 14 is at a position 19 and a lowermost position at bottom dead center when the eccentric 14 is at a position 20. The piston 11 moves through an intake stroke as it moves from top dead center to bottom dead center and moves through a compression stroke as it moves from bottom dead center back to top dead center. As the piston 11 reciprocates linearly in the cylinder 10, it also rocks due to the rigid connection between the piston 11 and the connecting rod 12. As illustrated in FIG. 1, a maximum angle "B" between the piston 11 and the cylinder axis 15 occurs during the intake stroke when the eccentric 14 is displaced 90 degrees from top dead center and is located at a position 21. A maximum angle "A" between the piston 11 and the cylinder axis 15 occurs during the compression stroke when the eccentric 14 is displaced 90 degrees from bottom dead center and is located at a position 22. Since the cylinder axis 15 passes through the crank shaft axis 16, the maximum angle "A" will be the same as the maximum angle "B".

Figure 2:
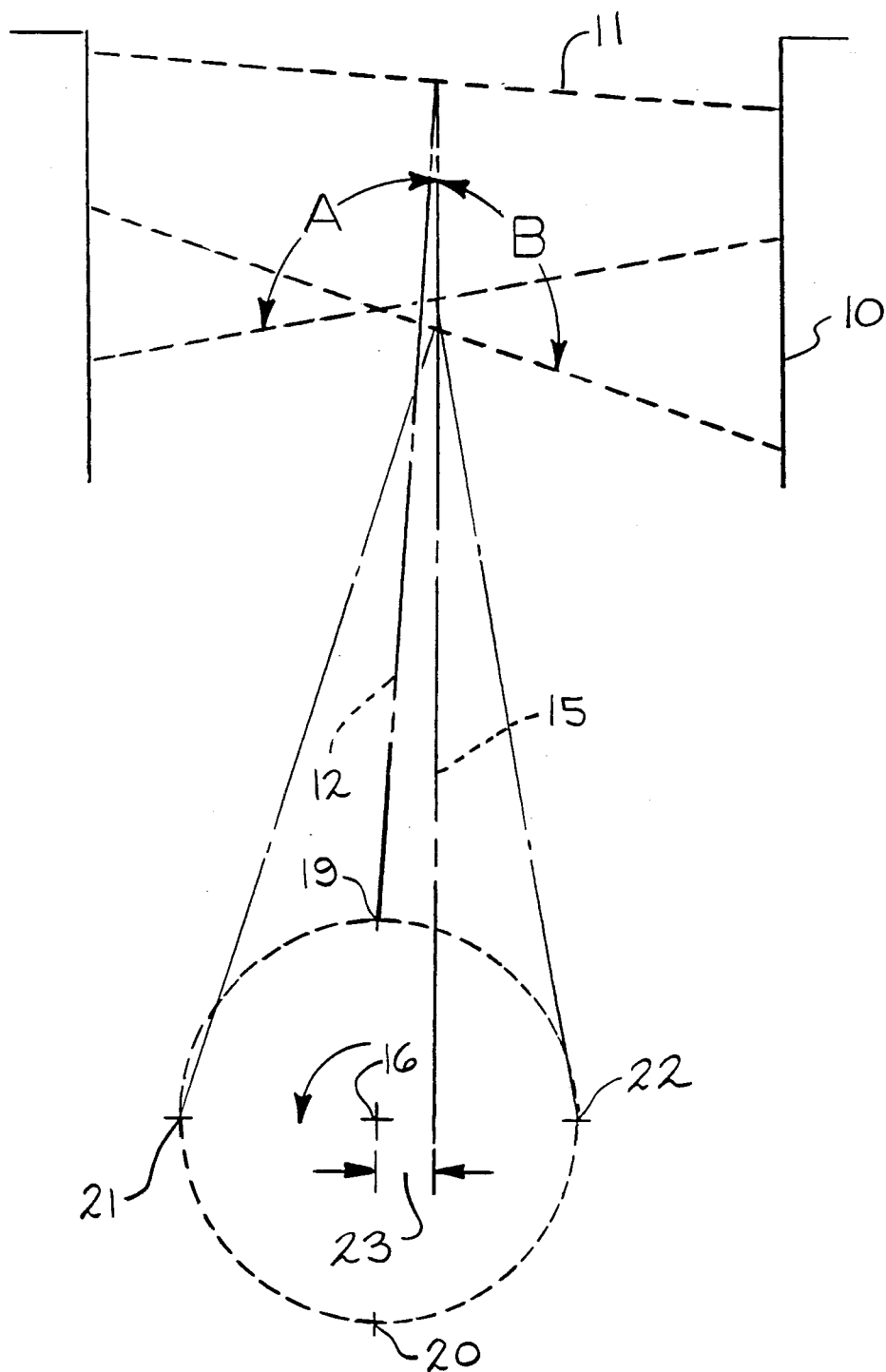
FIG. 2 is a fragmentary cross sectional view of a portion of a reciprocating piston oilless compressor according to the invention and illustrating the piston at different positions relative to the cylinder.

According to the invention, it has been found that by reducing the angle "A" during the compression stroke when the load on the piston is greatest, the maximum side loading on the piston 11 is reduced and consequently wear on the piston seal 17 is reduced. The reduced wear in turn extends the maintenance free operating life of the compressor. FIG. 2 is a fragmentary cross sectional view illustrating the invention. Parts in the compressor of FIG. 2 which are identical to the parts in FIG. 1 have been given the same reference numbers.

As illustrated in FIG. 2, the cylinder 10 is positioned relative to the crank shaft 13 so that the crank shaft axis 16 is displaced or offset from the cylinder axis 15 by a small amount 23 in a direction which decreases the maximum angle "A" between the piston 11 and the cylinder axis 15 during the compression stroke. When the axes 15 and 16 are displaced and the maximum piston angle "A" is decreased, the maximum piston angle "B" during the intake stroke is increased. The increase of the maximum angle "B" does not adversely affect the operating life of the piston seal 17 because of the small load on the piston 11 during the intake stroke. The displacement 23 has been overemphasized in FIG. 2 to more clearly illustrate the effect of the displacement 23 on the angles "A" and "B".

The optimal size of the displacement 23 will depend on the dimensions of the components of a compressor. The diameter of the piston 11, the length of the connecting rod 12, he size of the path of movement of the eccentric 14, and the design of the seal 17 will all have an effect on determining the optimal displacement 23. For any particular compressor design, the optimal displacement 23 can be determined experimentally by a person skilled in the compressor design art. The displacement 23 should not be so great that a full annular seal is not maintained between the piston seal 17 and the cylinder 10.

We claim:

1. In an oilless compressor of the type including a cylinder having an axis, a piston rigidly attached to a connecting rod and located to reciprocate in said cylinder, a seal attached to said piston extending completely around a perimeter of said piston to form a sliding seal with said cylinder throughout the stroke of said piston, a crank shaft having an axis and an eccentric which rotates about said crank shaft axis when said crank shaft is rotated, said connecting rod having an end spaced from said piston attached to said eccentric for rotary motion with said eccentric when said crank shaft rotated, said piston reciprocating in said cylinder in alternate intake and compression strokes when said connecting rod end is rotated by said eccentric, and wherein said piston rocks through a first maximum angle relative to the cylinder axis during the intake stroke and through a second maximum angle relative to the cylinder axis during the compression stroke as said piston is reciprocated, the improvement comprising offsetting said cylinder relative to said crank shaft to displace said cylinder axis from said crank shaft axis in a direction which reduces the maximum second angle during the compression stroke to reduce piston seal wear, said cylinder offset increasing said maximum first angle during the intake stroke by an amount insufficient to interrupt the seal between said piston and said cylinder.

* * * * *